United States Patent
Gzovskyy et al.

(10) Patent No.: US 10,190,630 B2
(45) Date of Patent: Jan. 29, 2019

(54) TIN-BASED SLIDING BEARING ALLOY

(71) Applicant: ZOLLERN BHW GLEITLAGER GMBH & CO. KG, Braunschweig (DE)

(72) Inventors: Kostyantyn Gzovskyy, Braunschweig (DE); Frank Reimer, Sickte (DE); Hans-Juergen Hentschel, Osterwieck (DE); Edgar Gust, Wolfenbuettel (DE)

(73) Assignee: Zollern BHW Gleitlager GmbH & Co. KG, Braunschweig (DE)

( * ) Notice: Subject to any disclaimer, the term of this patent is extended or adjusted under 35 U.S.C. 154(b) by 300 days.

(21) Appl. No.: 14/784,452

(22) PCT Filed: Apr. 10, 2014

(86) PCT No.: PCT/DE2014/000187
§ 371 (c)(1),
(2) Date: Oct. 14, 2015

(87) PCT Pub. No.: WO2014/169890
PCT Pub. Date: Oct. 23, 2014

(65) Prior Publication Data
US 2016/0084306 A1    Mar. 24, 2016

(30) Foreign Application Priority Data

Apr. 15, 2014 (DE) .................. 10 2013 006 3888

(51) Int. Cl.
*C22C 13/02* (2006.01)
*F16C 33/12* (2006.01)
*C22C 13/00* (2006.01)

(52) U.S. Cl.
CPC ............ *F16C 33/121* (2013.01); *C22C 13/00* (2013.01); *C22C 13/02* (2013.01)

(58) Field of Classification Search
None
See application file for complete search history.

(56) References Cited

U.S. PATENT DOCUMENTS

| 1,355,202 A | 10/1920 | Willoughby |
| 3,925,110 A | 10/1975 | Prematta et al. |
| 2003/0089432 A1 | 5/2003 | Carey et al. |
| 2009/0232431 A1* | 9/2009 | Roeingh ................ C23C 10/28 384/295 |

FOREIGN PATENT DOCUMENTS

| DE | 28 18 099 A1 | 11/1979 |
| EP | 0 717 121 A2 | 6/1996 |
| EP | 2 037 140 A2 | 3/2009 |
| EP | 2 333 129 A1 | 6/2011 |
| GB | 2 146 354 A | 4/1985 |
| JP | 2013-003 223 A | 1/2003 |

(Continued)

Primary Examiner — Colin W. Slifka
(74) Attorney, Agent, or Firm — W & C IP

(57) ABSTRACT

A tin-based sliding bearing alloy contains zinc as its principal alloying element at a content of 2 to 14% w/w and has the Sn—Zn eutectic as its main structural element. The content of zinc as the principal alloying element can be expanded to 2 to 30% w/w by the addition of additional alloying elements. Antimony and/or copper can additionally be used as further principal alloying elements.

18 Claims, 4 Drawing Sheets

(56) References Cited

FOREIGN PATENT DOCUMENTS

| | | |
|---|---|---|
| RU | 2 105 076 C1 | 2/1998 |
| SU | 640831 | 1/1979 |
| SU | 1 560 596 A1 | 4/1990 |
| WO | 2009/108975 A1 | 3/2009 |
| WO | 2012/028136 A2 | 3/2012 |

\* cited by examiner

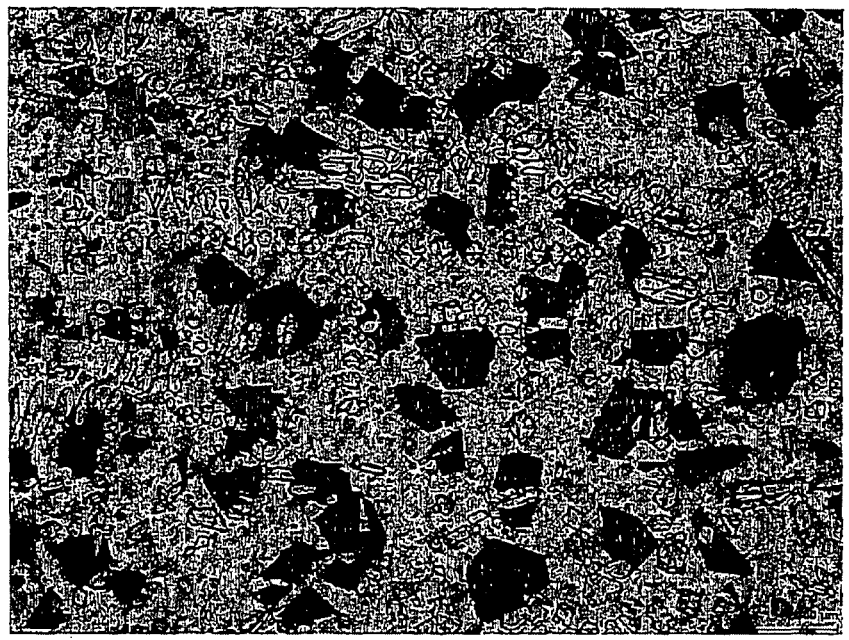
Alloy SnZn18Sb11Cu7.5;
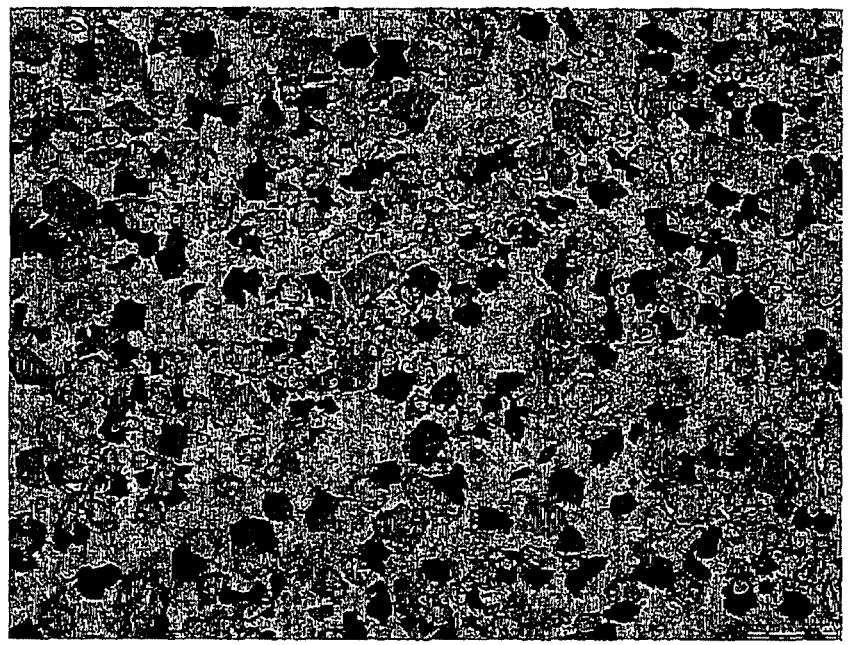
Alloy SnZn18Sb11Cu7.5Ni0.5Mn0.3Al0.05;

US 10,190,630 B2

TIN-BASED SLIDING BEARING ALLOY

FIELD OF THE INVENTION

The invention relates to a tin-based plain bearing alloy suitable for producing a plain bearing coating in a casting process and comprising at least one principal alloying element and a tin proportion of 25 to 98% by weight. The invention also relates to a use of the plain bearing alloy.

BACKGROUND OF THE INVENTION

Tin-based plain bearing alloys have been known for decades as white metals, for example, and comprise antimony and copper as principal alloying elements, the alloy being supplemented by further elements.

The plain bearing alloy is in this respect regularly cast onto a supporting structure, e.g. made of steel, for example in the form of a bearing supporting shell. The plain bearing alloy should have a good embedding capacity for dirt particles and a good adaptability to the elements which slide on one another, for example a rotating shaft. The tin-based sliding metal alloys have these properties, but are limited in terms of their load-bearing capacity. Since the demands made in respect of the durability of plain bearing alloys are on the increase, plain bearing alloys which can be subjected to a higher level of loading, for example those based on aluminum-tin, have therefore increasingly been used. However, these plain bearing alloys do not have the advantageous properties in respect of the embedding capacity and adaptability which the tin-based plain bearing alloys afford. Numerous tests have therefore been carried out to improve tin-based plain bearing alloys with respect to the load-bearing capacity, i.e. in particular with respect to their hardness and fatigue strength.

It is known from DE 28 18 099 C2 to provide a tin-based white metal containing the alloying elements antimony, copper and cadmium and also, as grain-refining elements, chromium and cobalt additionally with 0.02 to 0.08% by weight boron and 0.1 to 0.2% by weight zinc. A combined action of boron and zinc, together with cobalt and chromium, achieves a significant improvement in the strength property. The impairment in the bond to the steel supporting shell which arises as a result of zinc is nullified further by the addition of boron.

GB 2,146,354 A discloses a tin-based plain bearing alloy comprising the principal alloying elements antimony and copper, in which the strength is to be increased by grain refinement on account of the addition of titanium in a proportion of 0.005 to 0.5% by weight.

SU 1 560 596 A1 discloses a tin-based plain bearing alloy comprising, as principal alloying elements, 7 to 8% by weight copper, 10 to 12% by weight antimony and to 20% zinc, remainder tin. The alloy has an increased durability and wear resistance, but can be applied to a steel substrate only by means of arc spraying. If this alloy were to be applied by casting, it would not be usable as a plain bearing alloy owing to an excessively low toughness.

A further demand which is made in respect of the plain bearing alloys used is that of keeping said alloys free from pollutive alloying constituents, in order to ensure ecologically compatible plain bearing alloys (white metal alloys). It has not been possible to date, however, to create such plain bearing alloys which satisfy higher demands in terms of strength. Given higher demands in respect of the load-bearing capacity and in respect of the wear resistance, it is therefore often the case that aluminum-based bearing metals continue to be used, even though the use of these bearing metals means that it is necessary to dispense with the outstanding emergency running properties of tin-based bearing metal alloys.

WO 2009/108975 A1 discloses a white metal comprising 4 to 30% by weight antimony and 1 to 10% by weight copper. The alloy in this case should furthermore comprise an element selected from the group of elements consisting of cobalt, manganese, scandium and germanium, with a total concentration of between 0.2 and 2.6% by weight, and also at least one element selected from the group of elements consisting of magnesium, nickel, zirconium and titanium, with a total concentration of between 0.05 and 1.7% by weight, the sum proportion of antimony and copper, given an antimony content which corresponds at least to three times the copper content, being at most 35% by weight. The plain bearing alloy can contain an addition of 0.6 to 1.8% by weight, preferably 0.7 to 0.9% by weight, zinc. Zinc serves, through the formation of additional crystallization nuclei, for refining the copper-tin and tin-antimony phases. This prevents the growth of these phases to a harmful size. The lower limit of 0.6% by weight zinc arises from the fact that a smaller addition no longer generates a positive effect, whereas the upper limit arises from the fact that, above 1% by weight, the zinc is no longer dissolved in the tin solid solution, and a low-melting eutectic phase is formed, at a Tm of approximately 200° C., between tin and zinc, this lowering the high-temperature strength and also the corrosion resistance.

SUMMARY OF THE INVENTION

The present invention is based on the object of providing a tin-based plain bearing alloy which has an improved strength and, up to a certain operating temperature, increases the strength of the tin-based plain bearing alloy in such a way that it is possible to dispense with the use of aluminum-based plain bearing alloys.

According to the invention, according to a first aspect of the invention, with a plain bearing alloy of the type mentioned in the introduction, this object is achieved by the principal alloying elements 0 to 25% by weight antimony,
0 to 20% by weight copper, and
2 to 14% by weight zinc.

According to a second aspect of the invention, the object is achieved by the principal alloying elements 0 to 25% by weight antimony,
0 to 20% by weight copper, and
2 to 30% by weight zinc, and at least one additional alloying element selected from one or more of the following groups:

Group I:
cobalt, manganese, scandium, germanium and aluminum, with a total proportion of 0.001 to 2.6% by weight, Group II:
magnesium, nickel, zirconium and titanium, with a total proportion of 0.005 to 1.7% by weight, Group III:
bismuth, indium, cadmium and lead, with proportions of in each case at most 5% by weight and a total proportion of at most 8% by weight, Group IV:
lithium, silver, cerium, yttrium, samarium, gold, tellurium and calcium, with a proportion of in each case up to 2.5% by weight and a total proportion of up to 4% by weight, Group V:

arsenic, niobium, vanadium, chromium, tungsten, lanthanum and erbium, with a proportion of in each case at most 1.0% by weight and a total proportion of at most 2.25% by weight, Group VI:

phosphorus and boron, in each case with a proportion of at most 0.1% by weight and a total proportion of at most 0.2% by weight.

According to the first aspect of the invention, the plain bearing alloy comprises zinc in a proportion of 2 to 14% by weight as a principal alloying element. In addition, copper and/or antimony can be used as principal alloying elements.

Such a proportion of zinc as a principal alloying element was to be avoided according to existing knowledge among experts, since tin and zinc are known to form a low-melting eutectic microstructure given a zinc proportion of 8.8% by weight. The eutectic microstructure, having the low melting point of approximately 200° C., has been considered disadvantageous with respect to the high-temperature strength and the corrosion resistance. By contrast, the invention is based on the understanding that a plain bearing alloy with a high hardness and fatigue strength and with a suitable elasticity or plasticity up to an operating temperature of 198° C. can be produced by virtue of the principal structural element being a tin-zinc eutectic. Whereas experts have made every effort to date to prevent the formation of a eutectic microstructure, the present invention provides for using a eutectic microstructure as the principal structural element. On account of various hardening mechanisms, the eutectic microstructure of tin and zinc allows for the formation of a sufficiently hard and resistant microstructure. A concentration of 8.8% by weight zinc in tin forms the eutectic e(βSn+αZn). The eutectic thus consists of the two phases βSn solid solution and αZn solid solution. Alloying atoms dissolved in solid solutions bring about what is termed solid solution hardening. αZn particles incorporated in finely disperse form in the βSn matrix also represent obstacles to the migrating dislocations, and bring about particle hardening. Moreover, they bring about indirect strengthening, because they induce a strengthened formation of dislocations upon plastic deformation.

The alloy with the eutectic composition of 8.8% by weight zinc in tin has the lowest melting point of all possible alloys in the Sn—Zn system. At the eutectic point, the liquidus temperature coincides with the solidus temperature. A pure eutectic alloy accordingly has a melting point and not a melting or solidification interval. This results in a reduction in the inclination toward cracking, porosity and toward segregation, and therefore significant improvements in the technological and mechanical properties of the alloy are achieved.

It is known that eutectic alloys have a particular tendency toward severe supercooling. In the supercooled state, an icosahedral short-range order develops and clusters with a high packing density form. The icosahedral short-range order, on the one hand, and the solid body, on the other hand, have considerably differing packings. The increase in packing density given severe supercooling inhibits the diffusion of the atoms for the crystallization and for other phase transformations. In the case of a high degree of supercooling, the molten mass contains a large excess of free energy, which the system can utilize for diverse solidification paths far beyond the equilibrium in multiple metastable phases. It is thus possible for metastable solid bodies to form which can consist of supersaturated mixed phases, alloys with grain refinement, unordered superlattice structures and/or metastable crystallographic phases. Zinc proportions of more than 8.8% by weight in the alloy of the Sn—Zn system form a structure with the primary αZn phase. The primary αZn phase increases the hardness and strength and the wear resistance of the alloy, but has the tendency to reduce the plasticity. It arises therefrom that, according to the invention, the proportion of Zn may not become too high in a substantially pure Sn—Zn system, and is therefore limited to 14%, in order to retain the elasticity or plasticity required for a castable plain bearing alloy.

The zinc-containing alloy according to the invention is strengthened not only with the solid solution hardening but also with the additional matrix hardening (βSn) by particles (αZn) incorporated in finely disperse form, with the primary αZn phase and with metastable solid bodies. What is formed is a matrix with grain refinement comprising particles (αZn) in the eutectic e(βSn+αZn) and comprising primary particles (αZn).

The zinc does not form an intermetallic phase with the tin. The zinc is present in the matrix in the form of compact inclusions (particles). The zinc thus does not alter the interaction between the tin and other elements. It is therefore readily possible to add the conventional further principal alloying elements of copper and antimony in the conventional proportions of to 25% by weight antimony and 3 to 20% by weight copper.

A comparison between the microstructure of the alloy according to the invention and conventional plain bearing alloys, for example TEGOSTAR of Evonik Goldschmidt GmbH, as is distributed, for example, by Ecka Granules Germany GmbH, shows that the plain bearing alloy according to the invention comprises phases with a rounded shape and a matrix with grain refinement, i.e. that the lamellae and angular phases which arise in the TEGOSTAR alloy have been changed into rounded shapes.

In a second aspect of the invention, it is possible to produce a castable plain bearing alloy even with relatively high zinc contents of up to 30% by weight having the same advantageous properties and having a eutectic microstructure as the principal structural element, particularly if means for grain refinement and for stable cluster formation are added.

The additional alloying elements from the aforementioned groups I and II lead to the formation of particularly dense and stable clusters. In this respect, zinc, cobalt, nickel, manganese and germanium form clusters with a coordination number of 10, while scandium, magnesium, titanium, zirconium and aluminum form clusters with a coordination number of 12. These additional alloying elements bring about severe supercooling during the crystallization, and lead to an intensified change in the phase from lamellae and angular shapes into rounded shapes. A tin matrix with grain refinement is also formed. The additional alloying elements from these groups therefore lead to a significant increase in the strength, toughness and fatigue strength of the tin-based plain bearing alloys.

The elements from the third group, specifically bismuth, indium, cadmium and lead, are readily soluble in the tin matrix and form solid solutions. This brings about the solid solution hardening. The eutectic is formed given the low cooling rate. The individual proportions of the alloying elements must not exceed 5% by weight. The sum proportion has to be limited to 8% by weight.

The additional alloying elements from group IV, specifically lithium, silver, cerium, yttrium, samarium, gold, tellurium and calcium, form the eutectic e(βSn+$Sn_xM1_y$) with tin, M1 being one of the elements from said group. The eutectic thus consists of two phases, specifically βSn solid solution and the intermetallic phase $Sn_xM1_y$. Alloying atoms dissolved in the solid solutions bring about what is termed solid solution hardening. $Sn_xM1_y$ particles incorporated in finely disperse form in the matrix (βSn) represent obstacles to the migrating dislocations, and bring about particle hardening. Since the increase in the eutectic content can contribute to a reduction in plasticity, the individual proportions of these alloying elements should not exceed 2.5% by weight. The upper limit of the sum proportion has to be 4% by weight.

The elements from group V, specifically arsenic, niobium, vanadium, chromium, tungsten, iron, lanthanum and erbium, form a peritectic reaction with tin or lead to the formation of additional crystal nuclei of an $Sn_xM2_y$ phase or an M2 phase, M2 being one of the aforementioned metals. The additional crystallization nuclei lead to the refinement of the matrix (βSn), but also of the copper-tin and tin-antimony phase and of the primary zinc phase. Since the increase in the $Sn_xM2_y$ phase or the M2 phase can lead to a reduction in plasticity in this case, too, the individual proportions of these alloying elements should not exceed 1.0% by weight. The upper limit of the sum proportion has to be 2.25% by weight.

The elements P or B from group VI principally form additional crystallization nuclei and additional metastable phases. The additional crystallization nuclei can be the Sn4P3 phase or the B phase. Since the increase in said phases can contribute to a reduction in plasticity, the upper limit of the individual proportions of these alloying elements is 0.1% by weight. The sum proportion must not exceed 0.2% by weight.

The invention also relates to a plain bearing having a plain bearing coating consisting of a plain bearing alloy according to the invention.

The above statements will be explained in more detail hereinbelow on the basis of accompanying figures.

The comparison clearly shows that the microstructure according to the invention has finer grains and that the phases have been changed from lamellae and angular shapes into rounded shapes.

Figure 1:
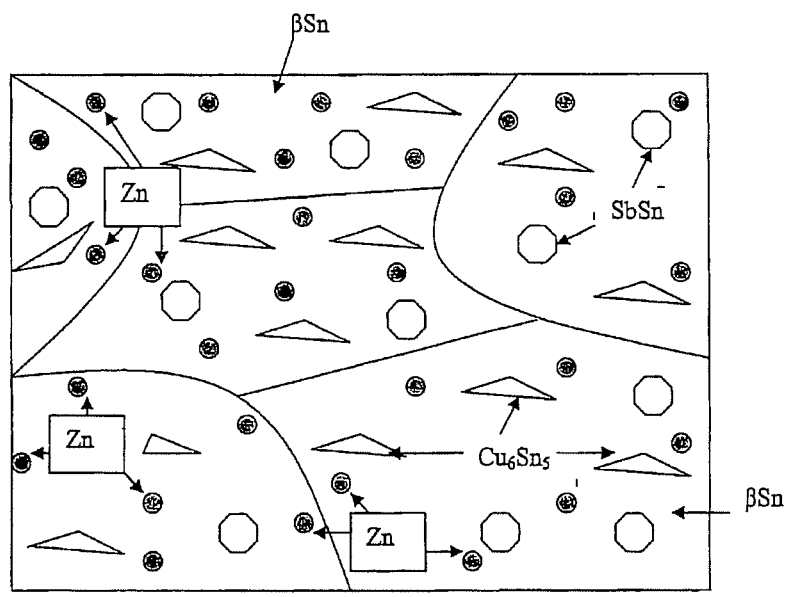
FIG. 1 shows a schematic illustration of a microstructure according to the invention of the alloy SnSb10Cu4Zn7. What are formed are eutectic microstructures e(βSn+αZn) with incorporated microstructural particles SbSn, βSn, $Cu_6Sn_5$ and αZn.
Figure 2:
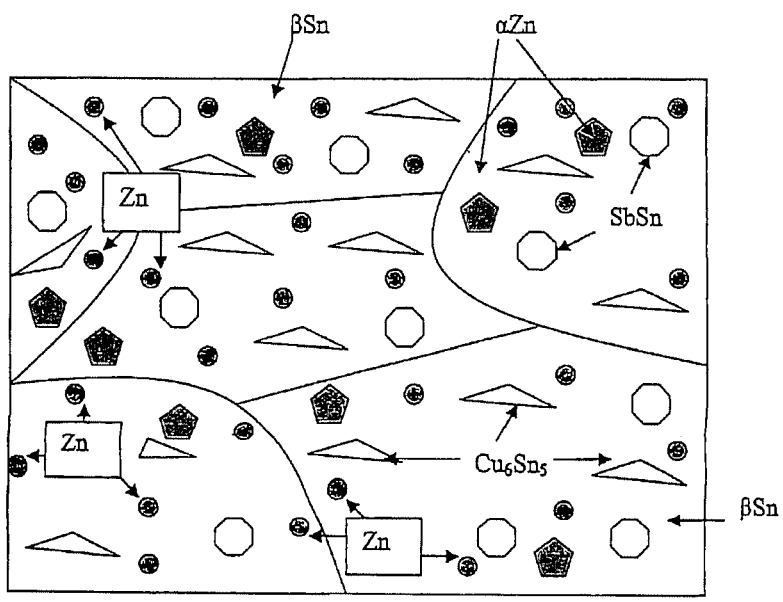
FIG. 2 shows a similar schematic illustration for the alloy SnSb12Cu5Zn14 with the microstructures αZn+SbSn+$Cu_6Sn_5$+e(βSn+αZn) comprising the phases βSn, $Cu_6Sn_5$, SbSn, αZn.
Figure 3:
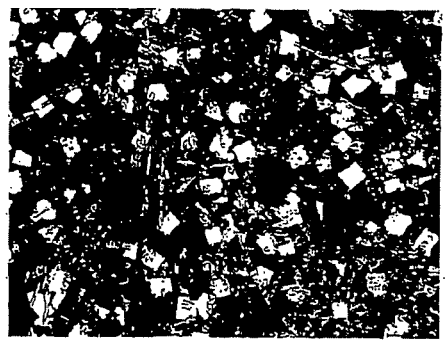
FIG. 3 shows micrographs, in different magnifications, of the microstructure TEGOSTAR as a gravity die casting and etched with $H_2O$+3% HNO3.
Figure 3:
Figure 4:
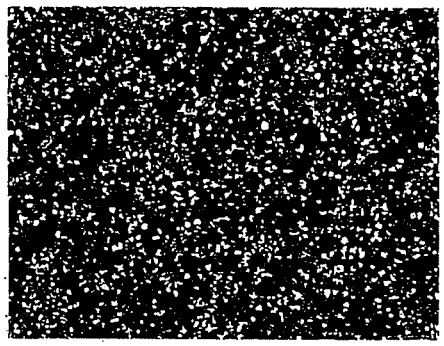
FIG. 4 shows, in comparison, the microstructure SnSb10Zn7Cu4CoNi as a gravity die casting etched with $H_2O$+3% HNO3.
Figure 4:
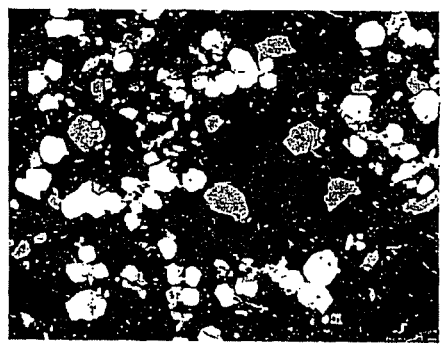
Figure 5:
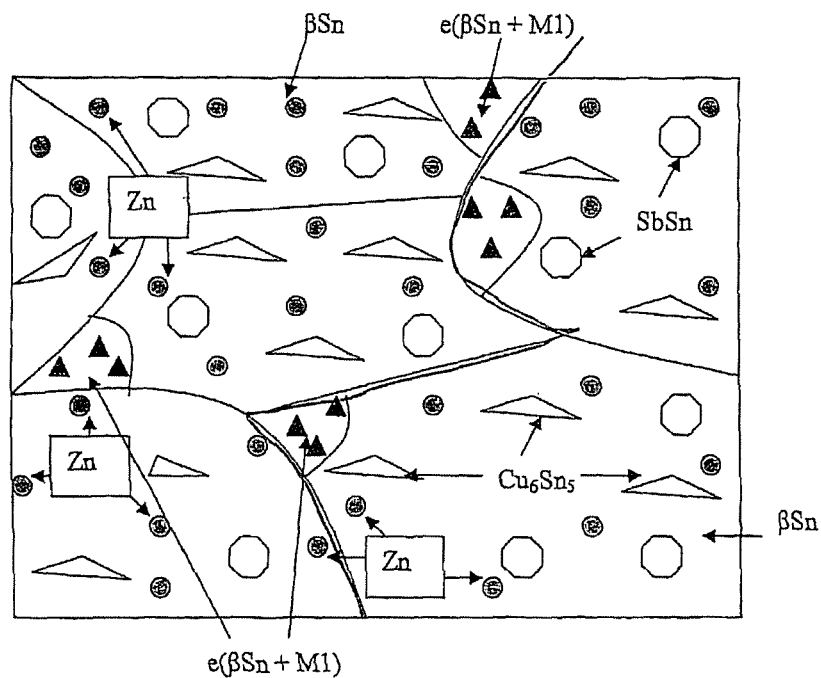

FIG. 5 schematically illustrates the microstructure of a plain bearing alloy according to the second aspect of the present invention. This alloy is SnSb10Cu4Zn7M1. It is shown that eutectic microstructures e(βSn+$βSn_xM1_y$) form and that phases βSn, $Cu_6Sn_5$, SbSn, $βSn_xM1_y$ or M1 arise.

Figure 6:
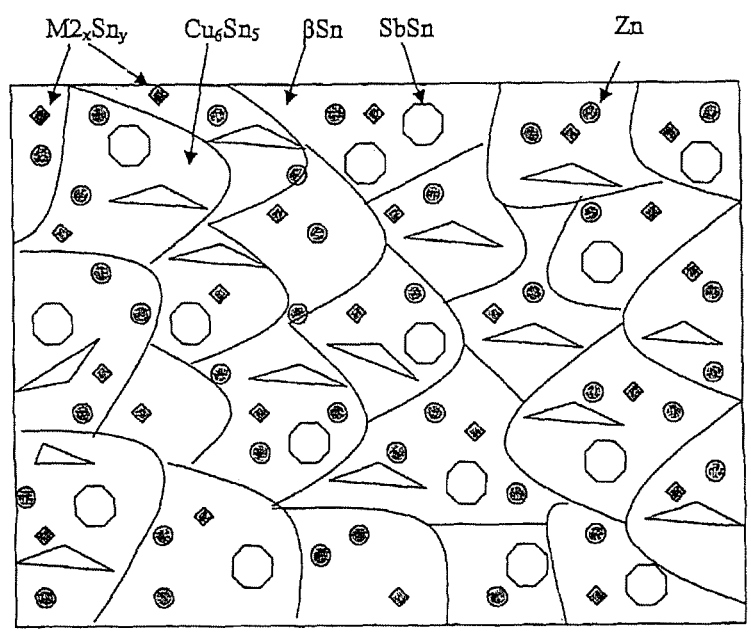

FIG. 6 shows a corresponding microstructure, formed from clusters, for an alloy SnSb10Cu4Zn7M2 of the above-described type. Said figure shows the pattern of the microstructure $M2_xSn_y$+βSn+SbSn+$Cu_6Sn_5$+e(βSn+αZn). αZn, βSn, $Cu_6Sn_5$, SbSn, $M2_xSn_y$ or M2 are shown as the phases.

DETAILED DESCRIPTION OF THE INVENTION

A number of exemplary embodiments of plain bearing alloys according to the invention will be described hereinbelow.

Example 1

A plain bearing alloy is produced customarily from 7.2% by weight Zn, 10.1% by weight Sb, 4.0% by weight Cu, 0.6% by weight Ni, 0.6% by weight Co, 0.05% by weight Zr and 0.1% by weight Cr, 0.05% by weight Fe, remainder tin. The plain bearing alloy exhibits good technological properties in terms of fatigue strength and a cast hardness of 35 HB 2.5/31.5/30 and a relative toughness of 309.

Example 2

A plain bearing alloy is produced customarily from 3.4% by weight Zn, 9.1% by weight Sb, 4.5% by weight Cu, 1% by weight Ni, 1.0% by weight Co, 0.05% by weight In, 0.1% by weight V, 0.1% by weight Cr, 0.04% by weight Pb, remainder tin. The plain bearing alloy exhibited good technological properties and a cast hardness of 32.0 HB 2.5/31.5/30 and a relative toughness of 502.

Example 3

A plain bearing alloy is produced customarily from 20.8% by weight Zn, 15.1% by weight Sb, 5.2% by weight Cu, 0.5% by weight Ni, 1.0% by weight Mn and 0.15% by weight Fe, remainder tin. The plain bearing alloy exhibited good technological properties and a cast hardness of 42.0 HB 2.5/31.5/30 and a relative toughness of 10.

Example 4

A plain bearing alloy is produced customarily from 22.3% by weight Zn, 5.1% by weight Cu, 0.5% by weight Ni, 1.2% by weight Mn, remainder tin. The plain bearing alloy exhibited good technological properties and a cast hardness of 30.0 HB 2.5/31.5/30 and a relative toughness of 8. Owing to the absence of antimony, this plain bearing alloy is completely free from pollutive alloying elements. Nevertheless, technical properties which are suitable for a plain bearing according to the invention are achieved.

Example 5

A plain bearing alloy is produced customarily from 28.2% by weight Zn, 9.03% by weight Sb, 4.0% by weight Cu, 0.25% by weight Cr, 0.3% by weight Ni, 0.3% by weight Co, 0.03% by weight Al, remainder tin. The plain bearing alloy exhibited good technological properties and a cast hardness of 45.0 HB 2.5/31.5/30 and a relative toughness of 5.

The deteriorated technological properties compared to the rest of the examples illustrate that an increase above the limit of 30% by weight Zn is no longer sensible.

Example 6 (Comparative Example)

The plain bearing alloy according to the invention as per example 1 was tested in a radial plain bearing fatigue test.

The test was carried out with a load amplitude of P lateral=39 MPa and at approximately 95° C. In this test, the plain bearing according to the invention withstood 122.8 million changes in load without suffering damage, i.e. without microstructural cracks.

Compared with the plain bearing alloy TEGOSTAR, damage in the form of microstructural cracks occurred during the same fatigue test.

Example 7 (Comparative Example)

A plain bearing alloy according to SU 1560596 A1 comprising 18% by weight Zn, 11% by weight Sb and 7.5% by weight Cu was examined using the same measurement methods. The cast hardness was 42 HB 2.5/31.5/30 and the relative toughness was 4. A micrograph of the microstructure obtained is shown in FIG. 7.

Example 8

For comparison with example 7, an alloy according to the invention comprising 18% by weight Zn, 11% by weight Sb, 7.5% by weight Cu was produced, with the addition of 0.5% by weight Ni, 0.3% by weight Mn and 0.05% by weight Al, remainder tin, and examined.

A cast hardness of 46 HB 2.5/31.5/30 and a relative toughness of 12 were obtained.

The micrograph of the microstructure according to this example, as shown in FIG. 8, shows, in comparison to FIG. 7, considerable refinement and rounding of the precipitations, giving rise to the improved technological properties.

The information relating to the relative toughness arises from a notched bar impact bending test. In this test, a cylindrical sample having a diameter of 32 mm is provided with a notch measuring 2 mm at a distance of 20 mm from the bottom end face, said notch extending to a depth of 12 mm into the body in the radial direction. The sample is clamped directly beneath the notch and then subjected to defined impacts perpendicular to the longitudinal axis of the sample from the side from which the notch was made. In the process, a weight suspended on a swivel is deflected through 90°. The drop is performed in such a manner that the weight impacts laterally onto the top end of the sample. The number of impacts until the sample fractures is established and specified as a measure of the relative toughness.

This is therefore a measurement method which is suitable only for determining relative values.

The invention claimed is:

1. A tin-based plain bearing alloy suitable for producing a plain bearing coating in a casting process, comprising at least one principal alloying element, a principal structural element, and a tin proportion of 25 to 98% by weight, wherein the at least one principal alloying element is selected from the group consisting of
   0 to 25% by weight antimony,
   0 to 20% by weight copper, and
   2 to 14% by weight zinc,
       and wherein the principal structural element is a tin-zinc eutectic having a βSn solid solution and an αZn solid solution as two phases, wherein said principal structural element has an icosahedral short-range order in the form of clusters.

2. The plain bearing alloy as claimed in claim 1 wherein the alloy has a microstructure that has a maximum grain size of up to 50 μm.

3. The plain bearing alloy as claimed in claim 2, wherein the microstructure has a maximum grain size of 30 μm.

4. The plain bearing alloy as claimed in claim 3, wherein the microstructure has a maximum grain size of 10 μm.

5. The plain bearing alloy as claimed in claim 1 wherein the at least one principal alloying element includes at least antimony between 6 and 25% by weight.

6. The plain bearing alloy as claimed in claim 1 wherein the at least one principal alloying element includes at least copper between 3 and 20% by weight.

7. The plain bearing alloy as claimed in claim 1 wherein the at least one principal alloying element does not include antimony.

8. The plain bearing alloy as claimed in claim 1 wherein the at least one principal alloying element includes zinc as the only principal alloying element.

9. A plain bearing having a supporting structure and a plain bearing coating which is applied thereto and consists of a plain bearing alloy as claimed in claim 1.

10. A tin-based plain bearing alloy suitable for producing a plain bearing coating in a casting process, comprising at least one principal alloying element, a principal structural element, and a tin proportion of 25 to 98% by weight, wherein the at least one principal alloying element is selected from the group consisting of
    0 to 25% by weight antimony,
    0 to 20% by weight copper, and
    2 to 30% by weight zinc,
        and wherein the principal structural element is a tin-zinc eutectic having a βSn solid solution and an αZn solid solution as two phases, wherein said principal structural element has an icosahedral short-range order in the form of clusters,
    and at least one additional alloying element selected from one or more of the following groups:
Group I:
cobalt, manganese, scandium, germanium and aluminum, with a total proportion of 0.001 to 2.6% by weight,
Group II:
magnesium, nickel, zirconium and titanium, with a total proportion of 0.005 to 1.7% by weight,
Group III:
bismuth, indium, cadmium and lead, with proportions of in each case at most 5% by weight and a total proportion of at most 8% by weight,
Group IV:
lithium, silver, cerium, yttrium, samarium, gold, tellurium and calcium, with a proportion of in each case up to 2.5% by weight and a total proportion of up to 4% by weight,
Group V:
arsenic, niobium, vanadium, chromium, tungsten, iron, lanthanum and erbium, with a proportion of in each case at most 1.0% by weight and a total proportion of at most 2.25% by weight,
Group VI:
phosphorus and boron, in each case with a proportion of at most 0.1% by weight and a total proportion of at most 0.2% by weight.

11. The plain bearing alloy as claimed in claim 10 wherein the alloy has a microstructure that has a maximum grain size of up to 50 μm.

12. The plain bearing alloy as claimed in claim 11, wherein the microstructure has a maximum grain size of 30 μm.

13. The plain bearing alloy as claimed in claim 11, wherein the microstructure has a maximum grain size of 10 μm.

14. The plain bearing alloy as claimed in claim 10 wherein the at least one principal alloying element includes at least antimony between 6 and 25% by weight.

15. The plain bearing alloy as claimed in claim 10 wherein the at least one principal alloying element includes at least copper between 3 and 20% by weight.

16. The plain bearing alloy as claimed in claim 10 wherein the at least one principal alloying element does not include antimony.

17. The plain bearing alloy as claimed in claim 10 wherein the at least one principal alloying element includes zinc as the only principal alloying element.

18. A plain bearing having a supporting structure and a plain bearing coating which is applied thereto and consists of a plain bearing alloy as claimed in claim 10.

* * * * *